Patented Nov. 19, 1929

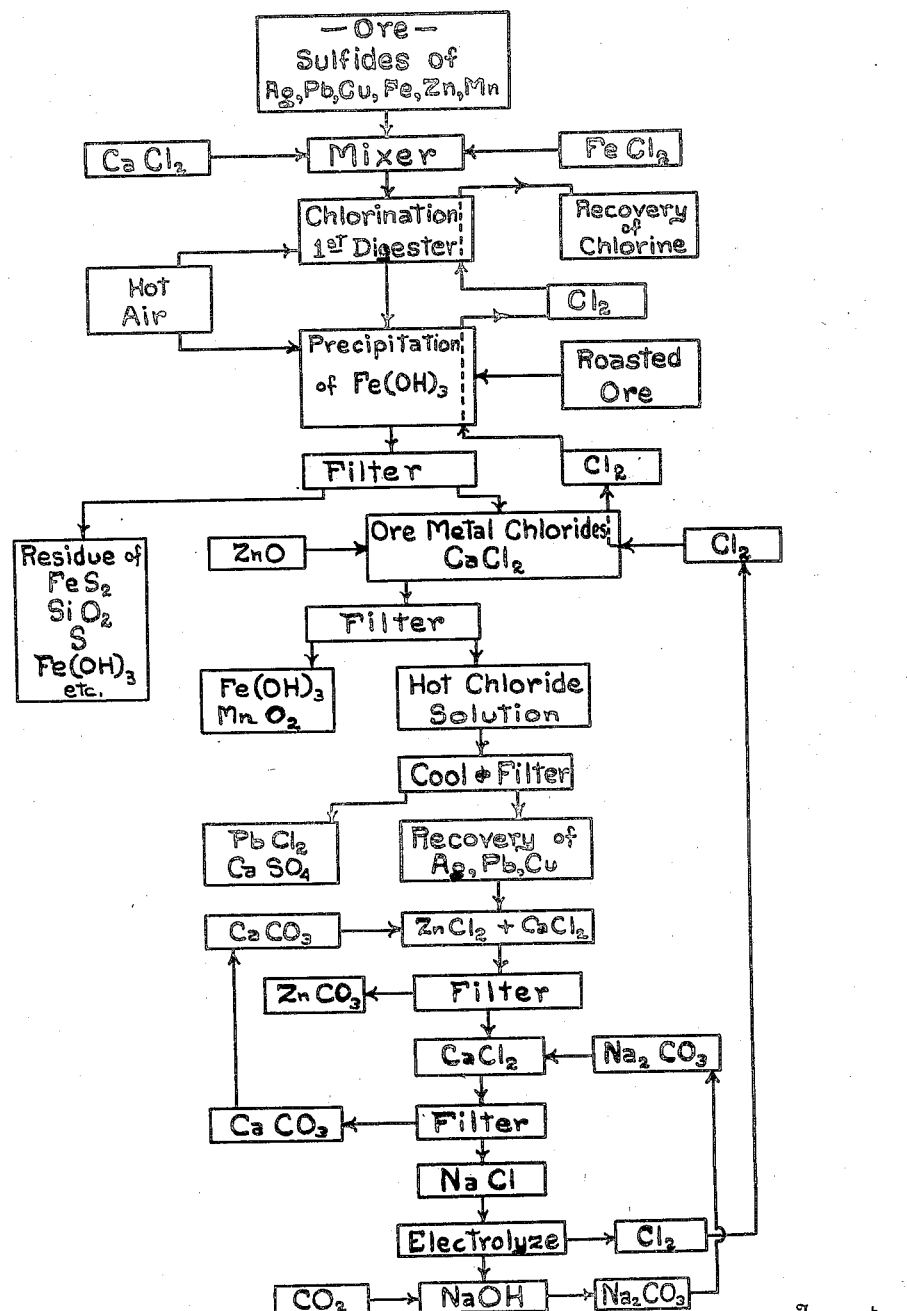

1,736,659

UNITED STATES PATENT OFFICE

THOMAS AUSTIN MITCHELL, OF DENVER, COLORADO, ASSIGNOR TO LAFAYETTE M. HUGHES, OF DENVER, COLORADO

METHOD OF TREATING ORES

Application filed October 11, 1926. Serial No. 141,023.

This invention relates to a method of treating a metallurgical ore and particularly a complex ore containing, in various combinations, such valuable metals as silver, lead, zinc, copper, iron, manganese and the like.

Many of the valuable metals are commonly found together in complex sulfide ores, and such ores are difficult to treat efficiently and economically for the recovery of their values, due both to the chemical nature of the materials as well as to the fact that the various sulfides are present as crystals intertwined with one another and with silica and other impurities found in the ore. These values may also exist as carbonates, oxides, and the like and their treatment presents similar problems. It has been considered desirable to recover such metal values as chlorides, and various methods have been proposed for converting the sulfides into chlorine compounds, but such methods have proven inefficient and unsatisfactory, and have involved the waste of valuable by-products as well as the loss of expensive reagents.

It is the main purpose of the present invention to overcome such difficulties and to provide a simple, easily operated and economical process for treating a complex ore, and particularly a sulfide ore, whereby the major portion of the valuable ore metal ingredients may be recovered.

A further object is to provide an efficient method of chlorinating such an ore and of recovering the values as chlorides for use as such or for conversion to other compounds.

Another object of the invention is to provide a cyclic process involving the use of cheap and easily obtainable reagents and particularly such reagents as are either produced from the ore itself or may be recovered and repeatedly returned to process for the treatment of further ore.

With these and other objects in view as will be apparent to one skilled in the art, my invention resides in the combination of steps set forth in the specification and covered by the claims appended hereto.

In accordance with my invention I propose to treat the raw complex ore directly in a chlorinating operation so as to transform the compounds of the ore metals into soluble chlorides. This is preferably accomplished by chlorinating the finely ground ore, which may be suitably concentrated if desired, with a chloride of a metal which is capable of changing its valency from a higher to a lower form during the process and of causing the available chlorine to combine with the metal values of the ore. Of the various chlorides of metals of more than one valency, I find that ferric chloride is well suited to serve as a chlorinating agent, and particularly since iron salts are commonly found in metallurgical ores, and the active reagent can therefore be obtained from the ore. Also manganic chloride is an efficient agent since it attacks sulfide ores rapidly and with an evolution of heat, hence for certain types of ore I may employ manganic chloride with the chlorides of such metals as iron and copper. In other cases falling within the scope of my invention, ferric and cupric chlorides, or the like, may be used alone or in combination. Iron, manganese and copper compounds are commonly found in the low grade complex ores to be treated, so that the ore itself may serve as a source of supply of the reagent. These chlorides will react in accordance with the following formula, assuming the reagent to be ferric chloride and the ore to be simply chalcopyrite—$CuFeS_2$:

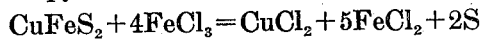

$$CuFeS_2 + 4FeCl_3 = CuCl_2 + 5FeCl_2 + 2S$$

More complex ores will react accordingly, and if oxides or carbonates are present, they will modify the reaction as will be understood by one skilled in the art. In order that the process may be carried out cyclically and continuously, I prefer to employ an oxidizing agent, such as chlorine gas, to convert the reduced metal chloride reagent to the higher chloride and thereby make it available for attacking a further amount of ore. This oxidizing agent is fed continuously to the chlorinating bath and into contact with the ore and the reaction products.

This chlorination step is carried out in an aqueous bath, and preferably in the presence of a carrier of chlorine. This carrier is intended to serve various purposes, and particularly to transport chlorine ions through various stages of the process and hold chlorine available for returning to the initial steps, as well as to aid in holding in solution any silver chloride which may be present during the initial stages of chlorination and to lessen the likelihood of the iron sulfide in the ore being chlorinated. Various materials may serve as carriers of chlorine during the various stages of the process, such as calcium or sodium chloride, since various compounds of sodium and calcium are suitable reagents for later stages of the process and their presence does not detrimentally affect the steps employed in recovering the metal values. I prefer to use calcium chloride, since I am thereby enabled to utilize calcium carbonate at a later stage to precipitate the zinc and leave only the cyclic carrier in the solution. This material moreover aids in the original digesting operation if sulfates of the ore metals are present.

Referring more particularly to the drawing, I have there illustrated diagrammatically one arrangement of steps, involving the use of both iron and manganese chlorides, which is suitable for treating a complex ore such as one containing the various sulfides of silver, lead, zinc, copper, iron, manganese and possibly other materials, including small amounts of oxides, carbonates or sulfates of these metals. In order that the ore may be readily attacked in an aqueous bath, it is finely ground and, if desired, it may be concentrated by any of the well known methods. This finely ground ore or mixed concentrate is then fed to a mixer where a solution of the chlorinating reagents, preferably ferric chloride alone or mixed with manganic chloride and the carrier of chlorine, preferably calcium chloride, are introduced. In the example given, both iron and manganese salts are present in the ore, so that both may serve as reagents. If the process is to be discontinuous, ferric and manganic chlorides are introduced directly into the pre-digestion tank. It is preferred, however, to run the process cyclically, and to continuously regenerate the ferrous and manganous chlorides, formed during the reaction, thus permitting the use of a small amount of the reagent. In that case, the iron and manganese compounds may be introduced as the lower chlorides and oxidized to the higher form during the digestion of the ore. This is accomplished by a suitable oxidizing agent, which is preferably chlorine gas. In actual practice, the mixed materials are fed to a preliminary digester, where the process is carried on with the aid of heat, and chlorine gas in excess is continually passed through the solution. The surplus gas goes then to suitable recovery apparatus, such as an absorption tower. This process results in the conversion of the sulfides of the valuable metals to chlorides. These go into solution and may be separated from the residue of pyrites, unattacked ore, sulfur, quartz, etc. by filtering. If lead chloride is present, it may be kept in solution by heating the bath. The calcium chloride introduced with the chlorinating agent serves not only to keep the silver chloride in solution, but it aids in increasing the concentration of the chlorine ions in the solution.

It is found that the tendency for the chloride reagents to attack the iron pyrite decreases as the concentration of the chlorine ions of the recovered ore metal chlorides increases. If there is insufficient zinc or lead or other desired ore metal chloride in the solution besides the iron chloride, I may maintain a high concentration of chlorine ions by the addition of suitable chlorides, such as calcium or sodium chloride. This reaction between the chlorides in the bath tending to convert the iron pyrite to a chloride is not rapid, and particularly in the presence of the more easily attacked sulfides, such as zinc or lead sulfide, which will be converted to chlorides before the iron sulfide will be attacked. It will also be noted that the ferric and manganic chloride reagents are not used in a concentrated solution, but that only a small amount of the chlorinating reagent is required, hence the major portion of the iron and manganese in the ore may be recovered. These reagents may be obtained from any suitable stage in the process and returned to the digesting tank in either the higher or lower forms or as mixtures thereof.

One difficulty heretofore met in the attempt to chlorinate a sulfide ore has been caused by the presence of the free sulfur formed during the reaction. The bath should be heated to increase the rate of the reaction and to increase the solubility of the salts. If, however, it is held at too high a temperature, the sulfur melts or softens and floats as a thick viscous mass on top of the bath, and it may react with the chlorine gas and form a detrimental product, or the viscous mass of sulfur may coat the ore particles and prevent their contact with the chlorinating agent. I have found that this may be overcome by keeping the temperature of the bath considerably below the melting point of sulfur and preferably just below the boiling point of the solution. In order that the bath may be heated to the desired temperature, and yet without diluting the solution, I prefer to employ air heated to the desired extent and this is blown directly into the liquid in the preliminary digester, thereby serving both to heat and to agitate the contents of the tank. The solution is preferably maintained hot until it is time to remove the lead compound. It will be understood that any heat evolved by the exothermic reactions between the manganese salt and the ore sulfides will aid in heating the bath, and this will be taken into account in controlling the bath temperature.

One phase of my invention as above noted comprises utilizing ingredients present in the ore, such as a compound of iron or of manganese for the principal reagent. In case ferric chloride is used alone, or even if manganese chloride is used, under certain conditions of treatment, the major portion of the iron sulfide in the ore is not attacked by the chlorinating agent, or by the chlorine in the presence of other sulfides, such as zinc sulfide; hence the iron sulfide will go largely into the residue. This may be suitably recovered and used to form the ferrous chloride reagent. It moreover is desirable that the iron and manganese chlorides in the bath be recovered for further use. To accomplish this, I preferably so treat the solution as to precipitate insoluble compounds thereof, and subsequently separate and treat them for returning as chlorides. This may be done at various stages of the process, but I prefer to remove the major portion of the iron in solution as soon as the preliminary digesting operation has been completed. This may be done by treating the solution in a second digestion apparatus, with an oxidizing agent capable of precipitating iron hydroxide therefrom. For this reagent, I may utilize such a material as calcium hypochlorite, but I ordinarily use zinc oxide, and preferably some of the crushed ore which has been previously roasted to an oxide condition, and pass chlorine gas continuously through the solution in the final digesting tank, whereby the iron chloride therefound is precipitated as ferric hydroxide. Any manganese chloride present may be thrown down similarly, but by careful manipulation of the process it may be held in solution and precipitated later, so that it may be largely separated from the iron.

Separation of the solids from the solution leaves the various chlorides of the metals of the ore along with the calcium chloride, as well as impurities which have gone into solution. The residue contains any unattacked ore, iron pyrites, the precipitated sulfur, ferric hydroxide and other insoluble materials, and it may be treated for the recovery of the sulfur and iron content, as desired. The hot chloride solution may now be treated in various ways to get the valuable ingredients therefrom. If the solution contains a manganese compound and some of the iron compound not previously removed, these may be finally removed therefrom by treatment in a suitable apparatus with zinc oxide in the presence of chlorine gas. This is accomplished with the aid of heat, and the manganese is precipitated as the dioxide. As illustrated, the chlorine gas may be introduced from a suitable source of supply to this apparatus and then passed to the second digesting tank and thence to the preliminary digestion tank, the excess of chlorine gas going to the recovery apparatus. The solution at this point is non-corrosive, due to the removal of the excess of ferric chloride. The manganese dioxide and the iron hydroxide upon being filtered from the solution may be returned as chlorides if desired for further treatment of ore, or otherwise disposed of.

The solution may be then cooled to precipitate the major portion of the lead chloride, and other insoluble substances, such as calcium sulfate, which may be present, and these are removed by filtration for further treatment as desired. The remaining solution containing silver, copper and zinc chlorides, as well as some lead chloride and the calcium chloride, may then be treated in a suitable manner to separate the silver, copper and lead values. One method involves passing the solution in succession over fragments of the proper metals of the electrochemical series to precipitate these ingredients. For example, the silver will be precipitated by metallic copper and the copper by metallic lead and the lead by metallic zinc. This leaves zinc and calcium chlorides in solution.

Various methods may be now employed for recovering the zinc and the chlorine which has been carried through the process in the calcium compound. My preferred method for removing the zinc chloride involves treating the solution with a suitable reagent, such as calcium carbonate, to form the insoluble zinc carbonate which may be separated for further treatment or use. This particular reagent, it will be noted, adds no new substance to the solution, but merely more of the cyclic carrier of chlorine, calcium chloride. The calcium chloride left in the solution may be recovered as such or it may be treated for recovery of chlorine. For example, the addition of sodium carbonate precipitates calcium carbonate and the sodium chloride formed may be electrolyzed to form chlorine gas and caustic soda, or sodium carbonate if carbon dioxide gas is added. If this latter salt is formed, it may be cyclically used to precipitate calcium carbonate from the calcium chloride solution left after precipitating zinc carbonate, as above explained. The chlorine gas is returned to process for further use, as shown in the drawing. All or a part of the calcium chloride in solution, and if desired the sodium chloride as well, may be returned to serve as a further carrier for chlorine ions through the various steps of reaction. Similarly, the zinc chloride solution may serve as a source of zinc oxide or zinc metal, in accordance with various known processes.

The raw ore may contain various metal sulfates, and these are taken care of by the calcium chloride in the digestion stage in accordance with the following reaction:

$$ZnSO_4 + CaCl_2 = CaSO_4 + ZnCl_2$$

The calcium sulfate precipitate goes off with the residues and any left in the hot solution may be removed with the lead chloride when the solution is cooled. As shown by the above formula, the calcium chloride, or other chloride added for this purpose as a cyclic carrier of chlorine, is a soluble salt capable of furnishing calcium or the like to react with any metal sulfate present and precipitate an insoluble sulfate and send the ore metal into solution as a chloride. The sulfates may be present as the result of the oxidized condition of the surface of the ore, or they may later appear in the process due to the addition of roasted ore to precipitate the iron in the solution. It will also be observed that at a later stage, the chloride solution is treated with a salt, such as calcium or sodium carbonate, capable of precipitating salt of the ore metal and leaving the chlorine ions in solution. The chlorine initially introduced is therefore carried in solution throughout the various stages of the process until most of the values of the ore have been recovered, after which the chlorine may be recovered along with the metal to which it is finally attached and returned to the initial stages of the cyclic process.

It will also be understood that various impurities may be present and minor secondary reactions may take place, but a chemist skilled in metallurgical practice will understand how to modify the general process outlined above so as to remove such impurities or to overcome the difficulties which they may present. Also, with suitable modifications, as will be readily understood, the process may be adapted to the treatment of carbonate and oxide ores. The process described is capable of giving high extraction results and it is flexible in operation and wide in its possibilities as to character of ore to be treated and the multiplicity of commercial products that may be obtained therefrom, whereby the manufacturer may vary his business as the chemical market fluctuates. Moreover, the cyclic recovery of chlorine permits one to return the major proportion of the chlorine to process and thereby minimize the consumption of an expensive reagent. This method results in the production of a minimum of sulfates, since the chloride reagent in the digester tends to stop the formation of such compounds. This means that the valuable ingredients of the ore are converted to chlorides, which may be easily handled in later operations, and hence there is less expensive apparatus required than heretofore found necessary.

Having thus described my invention, that which I claim as new and desire to secure by Letters Patent is:

1. The method of treating a complex sulfide ore comprising the steps of chlorinating it with a solution containing a small amount of a manganese chloride and in the presence of chlorine gas and a carrier of chlorine providing a high concentration of chlorine ions in the solution during the chlorinating operation, removing the residue and recovering metal values from the chloride solution.

2. The method of treating a complex sulfide ore comprising the step of chlorinating it with an aqueous solution containing a small amount of manganic chloride and another chloride of a metal capable of being reduced to a lower valency, and carrying on the reaction in the presence of chlorine gas and a sufficient amount of a soluble carrier of chlorine to maintain a high concentration of chlorine ions.

3. The method of treating a complex sulfide ore containing iron pyrite comprising the steps of chlorinating it with a small amount of an aqueous solution containing ferric and manganese chlorides while continuously passing hot air and chlorine gas therethrough, maintaining the temperature below the boiling point of the solution and preventing the sulfur from softening, maintaining a high concentration of chlorine ions in solution and minimizing the attack on the iron pyrite, and thereafter separating the iron pyrite and sulfur from the solution.

4. The method of treating a complex sulfide ore comprising the steps of mixing the ore with a solution containing calcium chloride and manganous chloride, passing chlorine through the mixture to form manganic chloride, digesting the mass with the aid of heat to form soluble chlorides of the metals of the ore while maintaining the temperature below the boiling point of the solution and ultimately separating the solution from the residue.

5. The method of treating a complex sulfide ore comprising the steps of chlorinating the raw ore with a hot aqueous solution containing a small amount of a chloride of a metal capable of being reduced to a lower valency and enough of a carrier of chlorine to provide a high concentration of chlorine ions, introducing chlorine gas into the bath, and controlling the temperature by introducing air to the bath to prevent the sulfur from melting, and subsequently separating the reagent metal from the solution and recovering the ore values.

6. The method of treating a complex sulfide ore containing iron pyrite comprising the steps of chlorinating the raw ore in a hot aqueous bath containing a small amount of ferric chloride and enough of calcium chloride to provide a high concentration of chlorine ions, passing chlorine gas continuously into the bath and regulating the temperature by introducing air to the bath, and subsequently precipitating the major portion of the iron by introducing an oxide of an ore metal to the chlorinated solution, and separating the residue from the chlorides of the ore metals.

7. The method of treating a complex sulfide ore containing iron pyrite comprising the steps of chlorinating the raw ore in a hot aqueous bath containing a small amount of ferric chloride and enough of calcium chloride to provide a high concentration of chlorine ions, passing chlorine gas continuously into the bath and regulating the temperature by introducing air to the bath, and subsequently precipitating the major portion of the iron by introducing an oxide of an ore metal to the chlorinated solution, separating the residue from the chlorides of the ore metals, and then recovering the ore values without introducing new metals into solution.

8. The method of treating a complex sulfide ore containing iron sulfide comprising the steps of chlorinating the ore in a solution containing a small amount of a chloride of a reagent metal capable of reducing in valency and of attacking the valuable metal sulfides rapidly and in preference to the iron sulfide, and containing a solution of a metal chloride carrier providing a high concentration of chlorine ions, while introducing chlorine gas continuously into the bath, then treating the acid solution with the oxide of an ore metal capable of precipitating the reagent metal, filtering out said precipitate and the unattacked residue, and subsequently precipitating an ore metal salt by adding a salt of the chlorine carrier metal, thereby introducing no new metal ions into the solution as reagents.

9. The method of treating a complex sulfide ore containing iron pyrite comprising the steps of chlorinating it with a solution containing a small amount of ferric chloride and in the presence of chlorine gas and enough calcium chloride to provide a high concentration of chlorine ions, precipitating the major portion of the iron from the solution, separating the sulfur and the iron pyrite and precipitate from the solution and subsequently recovering values from the metal chloride solution.

10. The method of treating a complex sulfide ore comprising the steps of chlorinating the ore with an aqueous solution of ferric chloride in the presence of calcium chloride and chlorine gas to form soluble chlorides of the ore metals, precipitating iron from solution by treating the solution with chlorine and an oxide of an ore metal separating the solution from the residue, and precipitating said ore metal from the solution with calcium carbonate thereby leaving calcium chloride in solution.

Signed at Denver, Colorado, this 4th day of October, 1926.

THOMAS AUSTIN MITCHELL.